(12) United States Patent
Shih et al.

(10) Patent No.: US 7,291,680 B1
(45) Date of Patent: Nov. 6, 2007

(54) METAL CATALYST AND HYDROGENATION METHOD EMPLOYING THE SAME

(75) Inventors: Kuo-Chen Shih, Kaohsiung (TW); Hung-Yu Chen, Tainan (TW); Tsai-Tien Su, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 11/600,176

(22) Filed: Nov. 16, 2006

(30) Foreign Application Priority Data

Dec. 30, 2005 (TW) .............................. 94147869 A

(51) Int. Cl.
*C08C 19/02* (2006.01)
*C08F 8/42* (2006.01)

(52) U.S. Cl. .................. 525/338; 525/326.1; 525/340; 525/360

(58) Field of Classification Search ............. 525/326.1, 525/338, 340, 360
See application file for complete search history.

(56) References Cited

U.S. PATENT DOCUMENTS

| | | | |
|---|---|---|---|
| 3,763,255 A | * | 10/1973 | Hayes .................... 585/434 |
| 3,993,855 A | * | 11/1976 | Kang ..................... 525/338 |
| 4,394,299 A | * | 7/1983 | Puskas et al. ............ 502/185 |
| 4,465,515 A | | 8/1984 | Mundorff |
| 4,503,196 A | | 3/1985 | Rempel et al. |
| 4,631,315 A | | 12/1986 | Buding et al. |
| 4,673,757 A | | 6/1987 | Fiedler et al. |
| 4,747,707 A | | 5/1988 | Komori |
| 4,795,788 A | | 1/1989 | Himmler et al. |

FOREIGN PATENT DOCUMENTS

| EP | 0405266 A2 | 6/1990 |
|---|---|---|
| GB | 2070023 A | 9/1981 |

* cited by examiner

*Primary Examiner*—Ling-Sui Choi
(74) *Attorney, Agent, or Firm*—Birch, Stewart, Kolasch & Birch, LLP

(57) ABSTRACT

A metal catalyst for hydrogenating unsaturated carbon-carbon bonds of copolymer is provided. The metal catalyst is a bimetallic complex comprising iridium and ruthenium. The metal catalyst has a formula comprising $M^1_a M^2_b X_m (L_1)_n$, wherein the $M^1$ is iridium, $M^2$ is ruthenium; X is hydrogen, chlorine, bromine, iodine or pseudo halide; $L_1$ is phosphine, bisphosphine, arsane or organic with nitrogen, sulfur and oxygen.

12 Claims, No Drawings

METAL CATALYST AND HYDROGENATION METHOD EMPLOYING THE SAME

BACKGROUND OF THE INVENTION

1. Field of the Invention

The invention relates to bimetallic catalytic systems and their applications, and in particular to selectively hydrogenate olefinic unsaturation in diene polymers and copolymers, comprising nitrile rubber (acrylonitrile-butadiene rubber; NBR)

2. Description of the Related Art

Selective hydrogenation of unsaturated carbon-carbon double bonds of nitrile rubber results in a product that is resistant to oils, ozone and sour gases, while maintaining a high service temperature. As a result, such compositions find particular utility in automotive applications like oil seals, timing belts and hoses, in which formed rubber products are exposed to adverse environments and sustained high temperatures. Thus, it is desirable to produce a hydrogenated nitrile rubber (HNBR) composition having the advantageous mechanical and resistance properties described above.

Hydrogenation of NBR is usually effected by hydrogen in an organic solvent, using homogeneous precious metal catalysts to achieve quantitative carbon-carbon double bond reduction, without concurrent hydrogenation of non-olefin functionality such as nitrile groups. Organometallic compounds comprising rhodium (Rh) as a catalyst are disclosed in GB 2,070,023, U.S. Pat. No. 4,465,515 and U.S. Pat. No. 4,503,196 etc. Rhodium catalyst provides high hydrogenation efficiency and selectivity, while their drawback is high cost.

Ruthenium (Ru) complexes as hydrogenation catalysts is disclosed to reduce cost in U.S. Pat. Nos. 4,631,315; 4,673,757; 4,747,707; 4,795,788; EP 0,405,266A2 etc. The advantage of Ru complex catalyst is its high catalytic activity in hydrogenation, with the drawback of comparatively low selectivity due to side reactions and gel formation.

Therefore, there is a need for a catalyst system which has higher activity, lower cost and results in no severe side-reactions in the hydrogenation reaction. Thus, there is still a need in searching for highly efficient and relatively low-cost methods of fabricating HNBR.

BRIEF SUMMARY OF INVENTION

The invention provides a bimetallic catalyst for hydrogenating unsaturated copolymers, the catalyst having similar activity and selectivity as rhodium (Rh) complexes, but is much lower in cost.

The invention further provides an improved method of hydrogenating unsaturated copolymer under mild conditions, with carbon-carbon double bonds of unsaturated copolymer hydrogenated for enhanced heat resistant, oxidation resistant and chemical resistant.

The invention also provides a method of forming hydrogenated nitrile-butadiene rubber with high efficiencies and decreased costs.

The metal catalyst of the invention is a bimetallic complex comprising iridium (Ir) and ruthenium (Ru), hydrogenating unsaturated copolymers. Molecular ratio of iridium and ruthenium is 1:9 to 9:1, preferably 1:5 to 5:1, in particular 1:1.

The metal catalyst of the invention has the following formula:

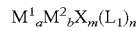

$M^1$ is iridium, $M^2$ is ruthenium; X is hydrogen, chlorine, bromine, iodine or pseudo halide; $L_1$ is phosphine (formula: $PR_1R_2R_3$), bisphosphine, arsane (formula: $AsR_1R_2R_3$) or organic with nitrogen, sulfur and oxygen, in which $R_1$ to $R_3$ are identical or different and represent $C_1$~$C_6$ alkyl, $C_6$~$C_{12}$ cycloalkyl, aryl, $C_7$~$C_{12}$ arakyl or aryloxy; $1 \leq a \leq 4$, b=0-4; $3 \leq m \leq 6$; $6 \leq n \leq 15$. L1 represents free trimethyl phosphine, triethyl phosphine, triphenyl phosphine, triphenyl phosphine, tri-p-methoxybenzyl phosphine, diphenethyl phosphine, 1,4-bis-diphenylphosphino butane, 1,2-bis-diphenylphosphino ethane, triphenyl arsenic, dibutylphenyl arsenic, diphenylethyl arsenic, triphenyl amine, triethyl amine, N,N-dimethyl aniline, diphenyl sulfone, dipropyl sulfone, N,N,N',N'-tetramethylethylene amine, acetyl acetone, benzophenone or a combination thereof.

In the method for hydrogenating unsaturated copolymer of the invention, a metal catalyst is provided comprising a bimetallic complex comprising iridium and ruthenium. The carbon-carbon double bonds (C=C) of unsaturated copolymer are hydrogenated by the metal catalyst.

The method of hydrogenating nitrile-butadiene rubber of the invention includes a metal catalyst. The metal catalyst is a bimetalliccomplex comprising iridium and ruthenium. The carbon-carbon double bonds are hydrogenated by the metal catalyst to generate a hydrogenated nitrile-butadiene rubber.

The method of hydrogenating an unsaturated copolymer with the metal catalyst comprises unsaturated copolymers dissolved in a solvent, under a hydrogen atmosphere, stirred and heated. Reaction temperature is 40 to 180° C., preferably 80 to 160° C.

In the method of the invention, hydrogen pressure of reaction is at 0.05 to 10 MPa, preferably at 0.1 to 1.5 MPa, in pure hydrogen gas.

The unsaturated copolymer is a copolymer comprising butadiene-(meth)acrylonitrile, 2-methyl-1,3-butadiene-(meth)acrylonitrile, styrene-butadiene-styrene block copolymers, preferably butadiene-acrylonitrile (nitrile-butadiene rubber). Other radical polymerizable monomers such as acrylates, methacrylates, acrylamides and styrenes can also incorporated into the main chain of the polymers.

The objects of the present invention can be apparent from the following detailed description accompanied with embodiments.

DETAILED DESCRIPTION OF INVENTION

The following description is of the best-contemplated mode of carrying out the invention. This description is made for the purpose of illustrating the general principles of the invention and should not be taken in a limiting sense. The scope of the invention is best determined by reference to the appended claims.

Preparation of a Bimetallic Catalyst for a Hydrogenating Unsaturated Copolymer.

EXAMPLE 1

First, under a nitrogen atmosphere, 3.12 g (12 mmloe) of triphenyl phosphine ($PPh_3$) and 22 g of absolute ethanol were added into a reaction vessel (Schlenk tube) equipped with a stirrer, a reflux condenser and placed in a thermostatic bath (70° C.). The reaction vessel was heated up for the dissolution of $PPh_3$. 0.352 g (1 mmole) of $IrCl_3.xH_2O$ and 0.24 g (1 mmole) of $RuCl_3.xH_2O$) were then dissolved in 4 g of absolute ethanol and the resultant solution was added to the reaction vessel and reacted at reflux temperature for 4 hours. The solution was then cooled down to room temperature, and pumped to remove all the volatile. The dark brown solid was obtained and stored under a nitrogen atmosphere. A bimetallic catalyst A was produced by steps above. Molecular ratio of iridium and ruthenium in the bimetallic catalyst was 1:1.

COMPARATIVE EXAMPLE 1

Under a nitrogen atmosphere, 3.12 g (12 mmloe) of triphenyl phosphine and 22 g of ethanol absolute were added into a reaction vessel (Schlenk tube) equipped with a stirrer, a reflux condenser and placed in a thermostatic bath (70° C.). The reaction vessel was heated up for the dissolution of $PPh_3$. 0.26 g (1 mmole) of $RhCl_3.xH_2O$ and 0.23 g (1 mmole) of $RuCl_3.xH_2O$ were mixed, dissolved in 4 g of absolute ethanol. Thereafter, the resultant solution was added to the reaction vessel and reacted at reflux temperature for 4 hours. The solution was then cooled down to room temperature, and pumped to remove all the volatile. The dark brown solid was obtained and stored under a nitrogen atmosphere. A bimetallic catalyst B was produced by steps above. Molecular ratio of rhodium and ruthenium in the bimetallic catalyst was 1:1.

EXAMPLE 2

A solution of nitrile butadiene rubber (NBR; product number is Nancar produced and sold by Nantex Industry Co., Ltd., 7 g of NBR/43 ml xylene) was added to a 0.2 L stainless autoclave. The stainless autoclave was repeatedly purged by nitrogen and hydrogen gas for three times, respectively. A solution, 0.42 wt % of bimetallic catalyst A of [example 1] was added to the stainless autoclave. The hydrogen pressure of the stainless autoclave was then increased to 0.2 Mpa, followed by heating. After the temperature of the stainless autoclave reached 120° C., the hydrogen pressure of the stainless autoclave was adjusted to 0.8 MPa, and the solution was then stirred vigorously for 4 hours under this condition. During the reaction, the hydrogen gas was supplied to maintain the constant pressure. After reaction, the product was precipitated by isopropyl alcohol, and vacuum dried for 24 hours at room temperature. The reaction formula in example 2 is:

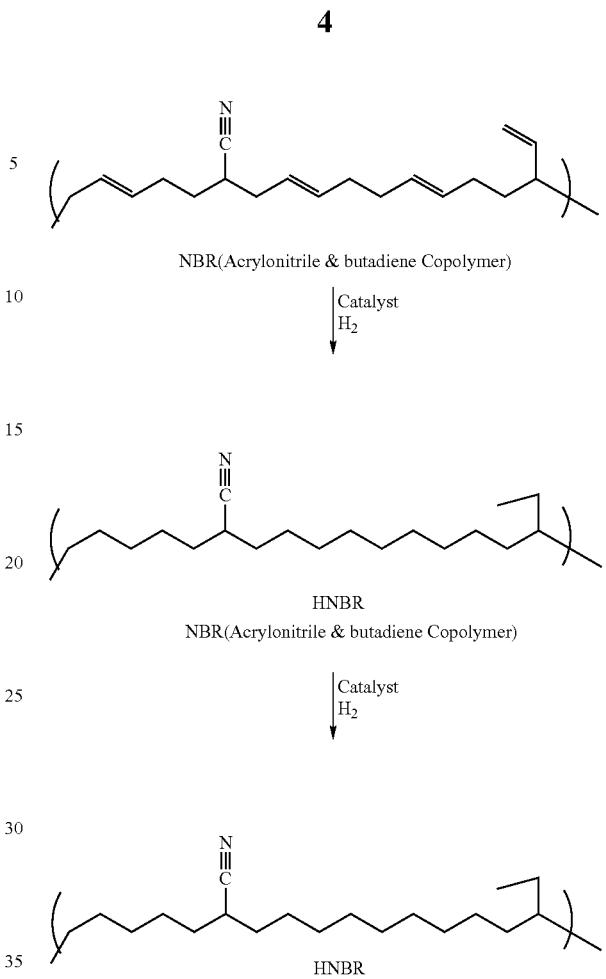

Thereafter, the product was dissolved in d-choroform, and analyzed by $^1HNMR$ to measure the degree of hydrogenation of NBR. The result is shown in Table 1.

COMPARATIVE EXAMPLE 2

A solution of nitrile butadiene rubber (NBR; product number is Nancar produced and sold by Nantex Industry Co., Ltd., 7 g of NBR/43 ml xylene) was added to a 0.2 L stainless autoclave. The stainless autoclave was repeatedly purged by nitrogen and hydrogen gas for three times, respectively. A solution, 0.42 wt % of bimetallic catalyst B of [comparative example 1] was added to the stainless autoclave. The hydrogen pressure of the stainless autoclave was then increased to 0.2 Mpa, followed by heating. After the temperature of the stainless autoclave reached 120° C., the hydrogen pressure of the stainless autoclave was adjusted to 0.8 MPa, and the solution was then stirred vigorously for 4 hours under this condition. During the reaction, the hydrogen gas was supplied to maintain the constant pressure. After reaction, the product was precipitated by isopropyl alcohol, and vacuum dried for 24 hours. Thereafter, the product was dissolved in d-choroform, and analyzed by $^1HNMR$ to measure the degree of hydrogenation of NBR. The result is shown in Table 1

TABLE 1

| Entry | Metal Catalyst | (molecular ratio) | Concentration of catalyst (%) | Reaction Temperature and Time (° C.-hr) | Pressure (MPa) | Degree of hydrogenation (%) |
| --- | --- | --- | --- | --- | --- | --- |
| Example 2 | A | iridium/ruthenium = 1:1 | 0.42 | 120-4 | 0.8 | 81% |
| Comparative Example 2 | B | rhodium/ruthenium = 1:1 | 0.42 | 120-4 | 0.8 | 76.0% |

Accordingly, a bimetallic catalyst comprising ruthenium and iridium of the invention is provided. For hydrogenation of carbon-carbon double bonds, the bimetallic catalyst of the invention has similar activity and selectivity as single Rh complexes, but is much lower in cost. The carbon-carbon double bonds of copolymer comprising butadiene and acrylonitrile are suitably hydrogenated by the bimetallic catalyst of the invention to improve the properties of the polymer.

While the invention has been described by way of example and in terms of embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A metal catalyst comprising a bimetallic complex for hydrogenating unsaturated polymers, wherein the bimetallic complex catalyst comprises iridium and ruthenium.

2. The metal catalyst of claim 1, having the formula:

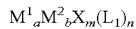

Wherein $M^1$ is iridium, $M^2$ is ruthenium; X is hydrogen, chlorine, bromine, iodine or pseudo halide; $L_1$ is phosphine (formula: $PR_1R_2R_3$), bisphosphine, arsane (formula: $AsR_1R_2R_3$) or organic with nitrogen, sulfur and oxygen, in which $R_1$ to $R_3$ are identical or different and represent $C_1$~$C_6$ alkyl, $C_6$~$C_{12}$ cycloalkyl, aryl, $C_7$~$C_{12}$ arakyl or aryloxy; $1 \leq a \leq 4$, $b=1$-4; $3 \leq m \leq 6$; $6 \leq n \leq 15$.

3. The metal catalyst of claim 2, wherein X is hydrogen or chlorine.

4. The metal catalyst of claim 2, wherein L1 represents free trimethyl phosphine, triethyl phosphine, triphenyl phosphine, triphenoxyl phosphine, tri-p-methoxybenzyl phosphine, diphenethyl phosphine, 1,4-bis-phenylphosphino butane, 1,2-bis-phenylphosphino ethane, triphenyl arsenic, dibutylphenyl arsenic, diphenylethyl arsenic, triphenyl amine, triethyl amine, N,N-dimethyl aniline, diphenyl sulfone, dipropyl sulfone, N,N,N',N'-tetramethylethylene amine, acetyl acetone, or benzophenone.

5. The metal catalyst of claim 2, wherein $L_1$ is triphenyl phosphine.

6. The metal catalyst of claim 1, wherein the unsaturated polymer is nitrile-butadiene rubber (NBR).

7. A method of hydrogenating unsaturated polymers, comprising:
    providing a metal catalyst, wherein the metal catalyst is a bimetallic complex catalyst comprising iridium and ruthenium; and
    hydrogenating unsaturated polymers by the metal catalyst.

8. The method of claim 7, wherein the metal catalyst hydrogenates a carbon-carbon double bond of the unsaturated polymer.

9. The method of claim 7, wherein the iridium and ruthenium have a molecular ratio of about 1:1.

10. The method of claim 7, wherein the unsaturated polymer is nitrile-butadiene rubber (NBR).

11. A method of producing hydrogenated nitrile-butadiene rubber, comprising
    providing a metal catalyst comprising a bimetallic complex catalyst comprising iridium and ruthenium; and
    hydrogenating a carbon-carbon double bond of nitrile-butadiene rubber by the metal catalyst to produce hydrogenated nitrile-butadiene rubber.

12. The method of claim 11, wherein the iridium and ruthenium have a molecular ratio of about 1:1.

* * * * *